United States Patent
Fard et al.

[11] Patent Number: 6,025,975
[45] Date of Patent: Feb. 15, 2000

[54] E-BLOCK HEAD STACK MICROACTUATOR ASSEMBLY

[75] Inventors: Anoush M. Fard, Agoura Hills; Khosrow Mohajerani, Newbury Park; Joseph M. Sampietro, Tarzana; Jeffrey G. Barina, Somis; Muhammad A. Hawwa, Simi Valley, all of Calif.

[73] Assignee: Seagate Technology, Inc., Scotts Valley, Calif.

[21] Appl. No.: 08/817,863
[22] PCT Filed: May 1, 1997
[86] PCT No.: PCT/US97/07352
   § 371 Date: May 1, 1997
   § 102(e) Date: May 1, 1997
[87] PCT Pub. No.: WO98/27546
   PCT Pub. Date: Jun. 25, 1998

Related U.S. Application Data

[60] Provisional application No. 60/032,993, Dec. 16, 1996.
[51] Int. Cl.⁷ ....................................................... G11B 5/56
[52] U.S. Cl. ............................................................. 360/109
[58] Field of Search ...................................... 360/104, 109

[56] References Cited

U.S. PATENT DOCUMENTS

| | | | |
|---|---|---|---|
| 4,764,829 | 8/1988 | Makino | 360/109 |
| 5,189,578 | 2/1993 | Mori | 360/109 |
| 5,303,105 | 4/1994 | Jorgenson | 360/109 |
| 5,521,778 | 5/1996 | Boutaghou | 360/109 |

*Primary Examiner*—A. J. Heinz
*Attorney, Agent, or Firm*—Kinney & Lange, P.A.

[57] ABSTRACT

A system for positioning a transducing head of a disc drive over a selected track (42) of a rotatable disc (40) includes an actuator assembly (20,50) having an E-block body (25) including a cavity (37), at least one actuator arm (30) extending from the E-block body (25), a head suspension mechanism (34,36,38) including the transducing head connected to an end of the actuator arm (30), and a pivot cartridge (26) in the cavity (37) in the E-block body (25). The E-block body (25) is attached to the pivot cartridge (26) and forms a hinge point (39) between the E-block body (25) and the pivot cartridge (26). A low resolution motor (22) rotates the actuator assembly (20,50) about an axis (24) to effect coarse positioning of the head with respect to the selected track (42) of the rotatable disc (40). A piezoelectric element (27,52) in the E-block body (25) is selectively expanded and contracted to distort the E-block body (25) around the hinge point (39) to effect fine positioning of the head with respect to the selected track (42) of the rotatable disc (40).

8 Claims, 5 Drawing Sheets

E-BLOCK HEAD STACK MICROACTUATOR ASSEMBLY

CROSS-REFERENCE TO RELATED APPLICATION

This application claims priority from Provisional Application No. 60/032,993 filed Dec. 16, 1996 for "Single Piezoelectric Actuator for Moving a Complete E-block Head Stack Assembly" by Anoush M. Fard, Khosrow Mohajerani, Joseph M. Sampietro, Jeffrey G. Barina and Muhammad A. Hawwa.

BACKGROUND OF THE INVENTION

The present invention relates to a dual-stage actuation system for a disc drive, and more particularly to a microactuator for effecting fine positioning of an entire E-block.

Radial track density in disc drives continues to increase, resulting in an increased need for extremely precise head positioning systems. Voice coil motor (VCM) actuators are well-suited to effect coarse positioning, but lack the resolution to finely position and center a transducing head over a selected track. This inadequacy has led to a variety of proposals for a second stage microactuator to effect fine positioning in high track density disc drives.

The microactuator proposals have taken several forms, from an electrostatic microactuator attached to the slider carrying the transducing head, to a piezoelectric microactuator installed at the head suspension mounting block at a distal end of the actuator arm. These proposals all associate the microactuator with components of each individual actuator arm, which imposes an artificial minimum thickness constraint on the actuator arms. In other words, the actuator arms must be thick enough to accommodate the microactuator. This constraint contradicts the general design objective of minimizing the mass of the actuator arms in the disc drive system. In addition, the proposed designs locate the microactuator a substantial distance from the E-block pivot, introducing head skew and failing to maximize the displacement of the head for a corresponding movement of the microactuator.

Therefore, there is a need in the art for a dual-stage actuation system including a microactuator that does not limit the minimum thickness of the actuator arms, minimizes head skew in fine positioning operations, and maximizes head displacement for a corresponding microactuator movement.

SUMMARY OF THE INVENTION

The present invention is a system for positioning a transducing head of a disc drive over a selected track of a rotatable disc having a plurality of concentric tracks. An actuator assembly includes an E-block body having a cavity. The E-block body is movable about an axis. At least one actuator arm extends from the E-block body. A head suspension mechanism including the transducing head is connected to an end of the actuator arm. A pivot cartridge is provided in the cavity in the E-block body. The E-block body is attached to the pivot cartridge and forms a hinge point between the E-block body and the pivot cartridge. A low resolution motor rotates the actuator assembly about the axis to effect coarse positioning of the head with respect to the selected track of the rotatable disc. A piezoelectric element is provided in the E-block body, and is selectively expanded and contracted based on a voltage across the piezoelectric element to distort the E-block body around the hinge point to effect fine positioning of the head with respect to the selected track of the rotatable disc. In one embodiment, a relief is formed in the E-block body adjacent to the hinge point to facilitate distortion of the E-block body in response to expansion and contraction of the piezoelectric element.

Another aspect of the invention is a method of positioning a transducing head of a disc drive over a selected track of a rotatable disc having a plurality of concentric tracks. An actuator assembly is provided, having an E-block body including a cavity, at least one actuator arm extending from the E-block body, a head suspension mechanism including the transducing head connected to an end of the actuator arm, and a pivot cartridge in the cavity in the E-block body. The E-block body is attached to the pivot cartridge and forms a hinge point between the E-block body and the pivot cartridge. A low resolution motor is operated to rotate the actuator assembly about the axis to effect coarse positioning of the head with respect to the selected track of the rotatable disc. A voltage is applied to selectively expand and contract a piezoelectric element in the E-block body, thereby distorting the E-block body around the hinge point to effect fine positioning of the head with respect to the selected track of the rotatable disc. In one form of this aspect, a relief is formed in the E-block body adjacent to the hinge point to facilitate distortion of the E-block body in response to expansion and contraction of the piezoelectric element.

DETAILED DESCRIPTION OF THE PREFERRED EMBODIMENTS

Figure 1:
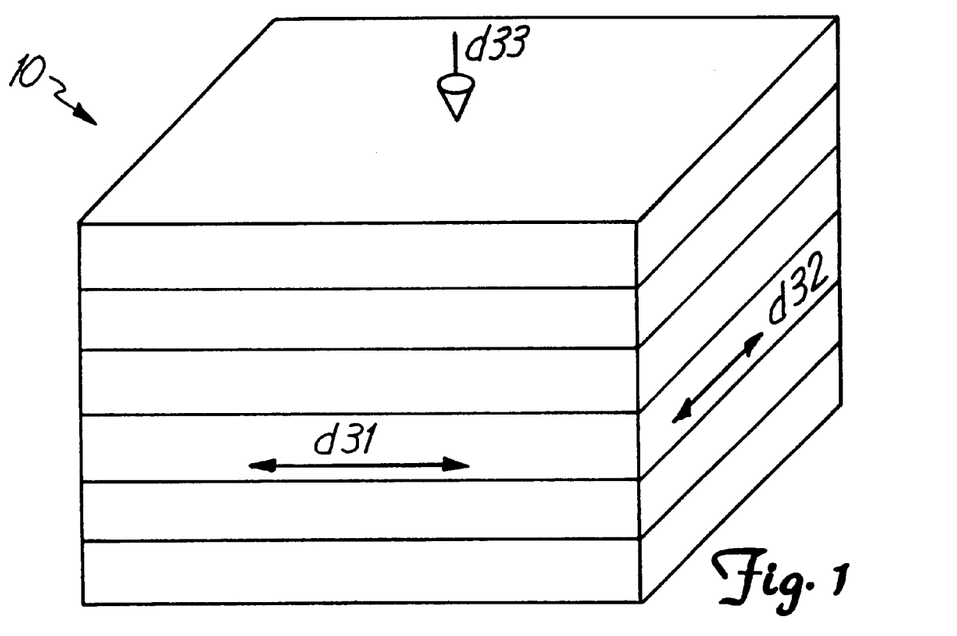
FIG. 1 is a perspective view of a stacked piezoelectric element.

FIG. 1 is a simplified perspective view of a stacked piezoelectric element 10. Element 10 is shown with three axes, labeled d31, d32 and d33. A potential difference between spatially separated points along the d33 axis causes expansion or contraction of element 10 in the d31, d32 and/or d33 directions, depending on the polarization of the piezoelectric crystal layers making up element 10. Thus, piezoelectric element 10 can be used to supply an expanding or contracting force in the d31, d32 and/or d33 directions based on an applied voltage.

Figure 2:
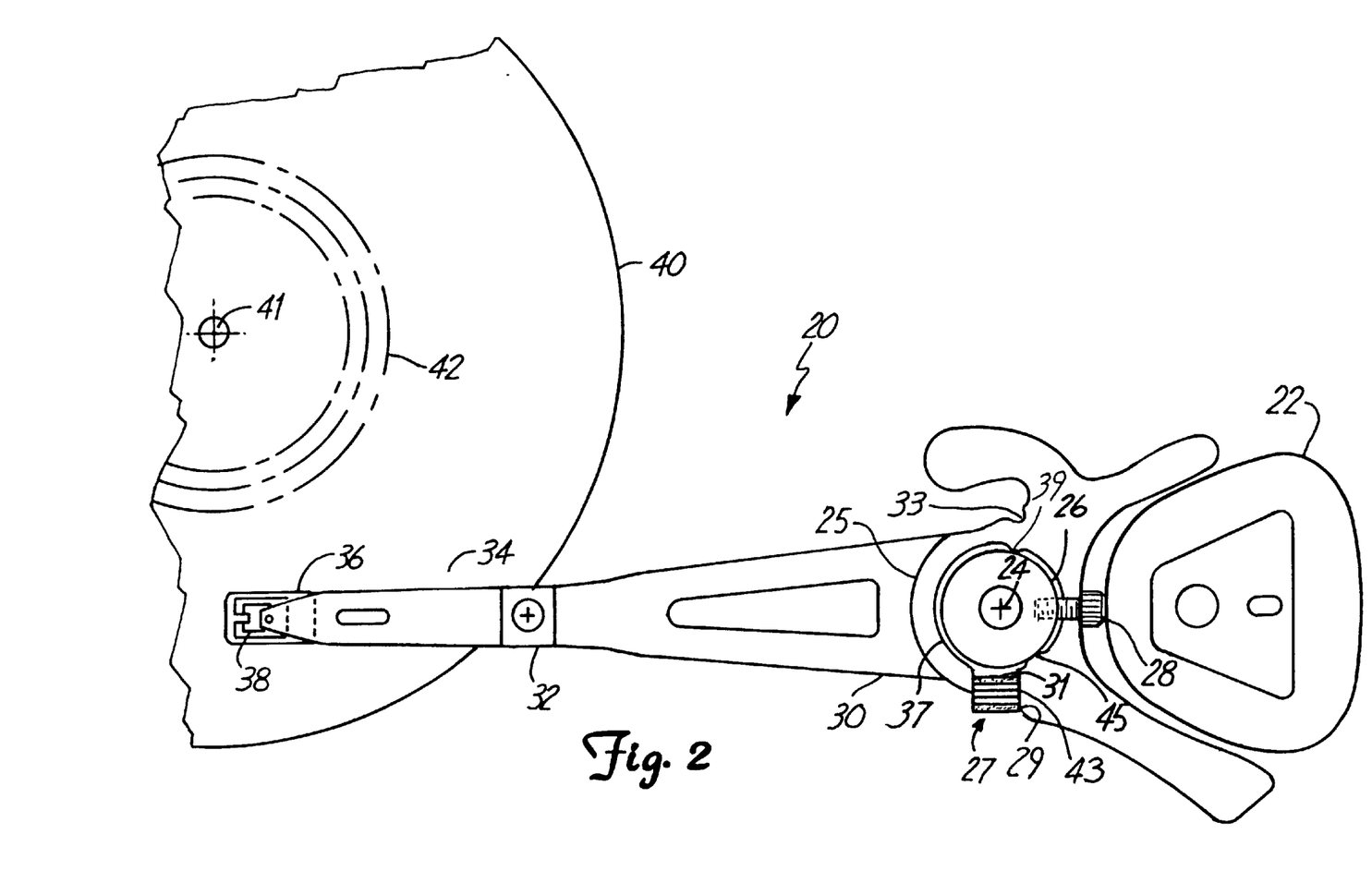
FIG. 2 is a plan view of a disc drive actuation assembly utilizing an E-block piezoelectric microactuator according to the present invention.

FIG. 2 is a plan view of a disc drive actuation assembly 20 according to the present invention. Disc drive actuation assembly 20 includes voice coil motor (VCM) 22, E-block body 25, actuator arms 30 extending from E-block body 25, load beam 34 connected to actuator arm 30 at head mounting block 32, and gimbal 36 connected at a distal end of load beam 34 to support slider 38, which in turn carries a transducing head. Pivot cartridge 26 is provided in cavity 37 in E-block body 25, and is rigidly fastened to E-block body 25 at one end, such as by one or more screws 28. Piezoelectric element 27 is provided in E-block body 25 and includes terminals 29 and 31. E-block body 25 is supported at three points to pivot cartridge 26: at fastener 28 along the longitudinal axis of E-block body 25, at a point 45 adjacent to proximal end 43 of piezoelectric element 27, and at hinge point 39.

Figure 3:
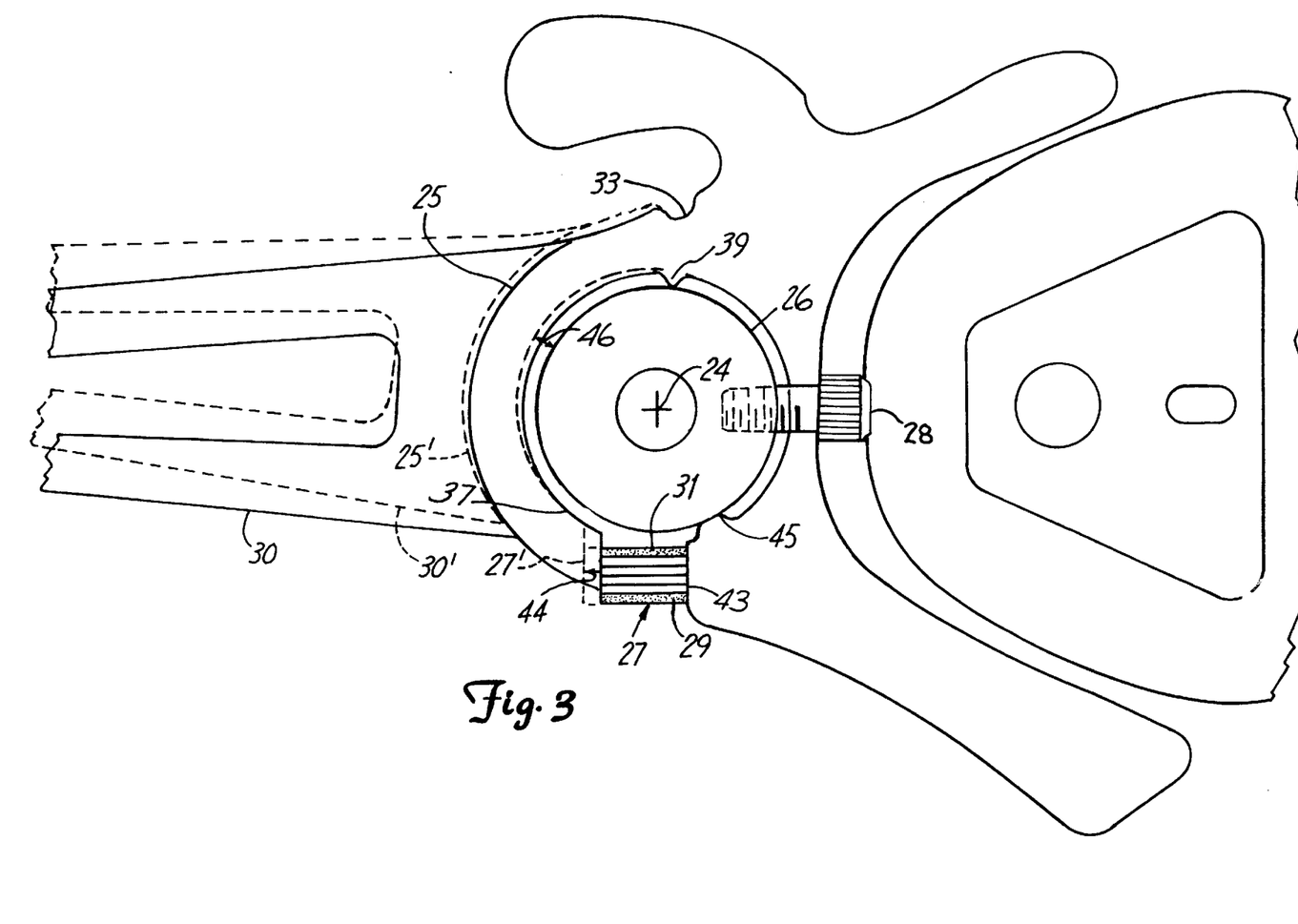
FIG. 3 is an enlarged plan view of the E-block piezoelectric microactuator shown in FIG. 2.

VCM 22 is operated in a manner known in the art to rotate E-block body 25 and pivot cartridge 26 around axis 24 and thereby coarsely position slider 38 over selected tracks 42 of disc 40 rotating around axis 41. For more precise movements, piezoelectric element 27 is selectively expanded or contracted along its d32 axis by applying a voltage to terminals 29 and 31, distorting E-block body 25 to alter the position of slider 38 with respect to tracks 42 of disc 40. Relief 33 is preferably formed in E-block body 25 adjacent to hinge point 39, to facilitate distortion of E-block body 25 in response to expansion or contraction of piezoelectric element 27. Alternatively, a portion of E-block body 25 near hinge point 39 may be composed of compliant material to achieve this result FIG. 3 is an enlarged plan view of the microactuation system of disc drive actuation assembly 20 shown in FIG. 2. Piezoelectric element 27 may be selectively controlled, by applying a voltage at terminals 29 and 31 to expand in the direction of arrow 44 (along the d32 axis of piezoelectric element 27), an exaggerated outer profile of the expanded element being shown in dashed lines as 27'. Expansion occurs only in the direction of arrow 44 because the E-block body material adjacent to the proximal end 43 of piezoelectric element 27 is rigidly fastened to pivot cartridge 26 at point 45. The expansion of piezoelectric element 27 distorts E-block body 25 to the position shown in dashed lines as 25'. Essentially, gap 46 between E-block body 25 and pivot cartridge 26 is widened, as E-block body 25 distortionally rotates due to the expansion of piezoelectric element 27. The elastic distortion of E-block body 25 is focused at its weakest point, which is the narrow portion of E-block material between hinge point 39 and relief 33, straining that material within elastic limits to distortionally rotate E-block body 25. Actuator arm 30 is therefore displaced to the position shown in dashed lines as 30'. In a similar manner, contraction of piezoelectric element 27 would operate to narrow gap 46 between E-block body 25 and pivot cartridge 26, thereby displacing actuator arm 30 downward in the configuration shown in FIG. 3.

Figure 4:
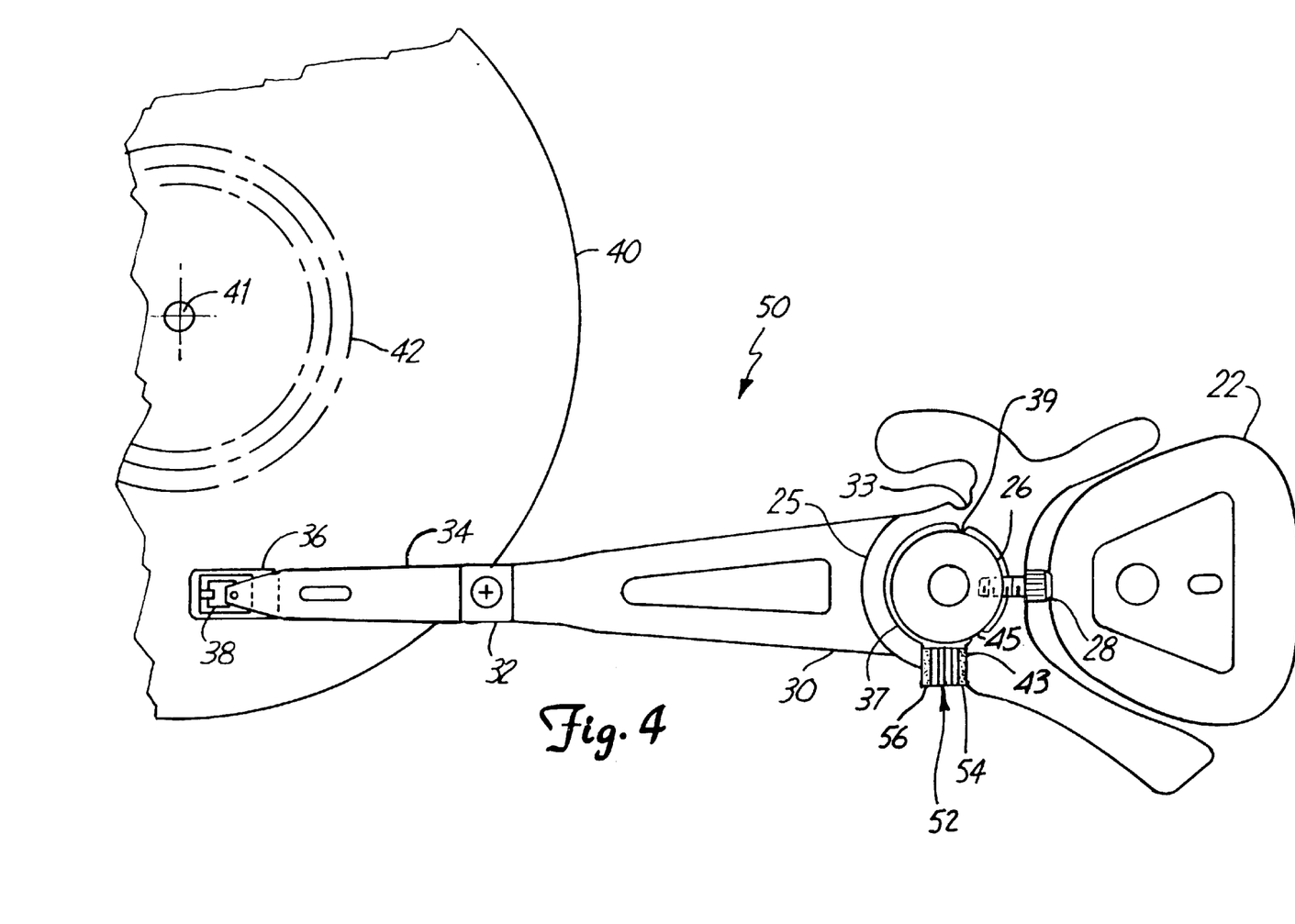
FIG. 4 is a plan view of a disc drive actuation assembly utilizing an E-block piezoelectric microactuator according to a further embodiment of the present invention.

FIG. 4 is a plan view of a disc drive actuation assembly 50 according to a further embodiment of the present invention. Disc drive actuation assembly 50 includes VCM 22, E-block body 25, actuator arm 30 extending from E-block body 25, load beam 34 connected to actuator arm 30 at head mounting block 32, and gimbal 36 connected at a distal end of load beam 34 to support slider 38, which in turn carries a transducing head. Pivot cartridge 26 is provided in cavity 37 in E-block body 25, and is rigidly fastened to E-block body 25 at one end, such as by one or more screws 28. Piezoelectric element 52 is oriented 90° to the orientation of piezoelectric element 27 shown in FIGS. 2 and 3, and is provided in E-block body 25 and includes terminals 54 and 56. E-block body 25 is supported at three points to pivot cartridge 26: at fastener 28 along the longitudinal axis of E-block body 25, at a point 45 adjacent to proximal end 43 of piezoelectric element 52, and at hinge point 39.

VCM 22 is operated in a manner known in the art to rotate E-block body 25 and pivot cartridge 26 around axis 24 and thereby coarsely position slider 38 over selected tracks 42 of disc 40 rotating around axis 41. For more precise movements, piezoelectric element 52 is selectively expanded or contracted along its d33 axis by applying a voltage to terminals 54 and 56, distorting E-block body 25 to alter the position of slider 38 with respect to tracks 42 of disc 40. Relief 33 is preferably formed in E-block body 25 adjacent to hinge point 39, to facilitate distortion of E-block body 25 in response to expansion or contraction of piezoelectric element 52. Alternatively, a portion of E-block body 25 near hinge point 39 may be composed of compliant material to achieve this result.

Figure 5:
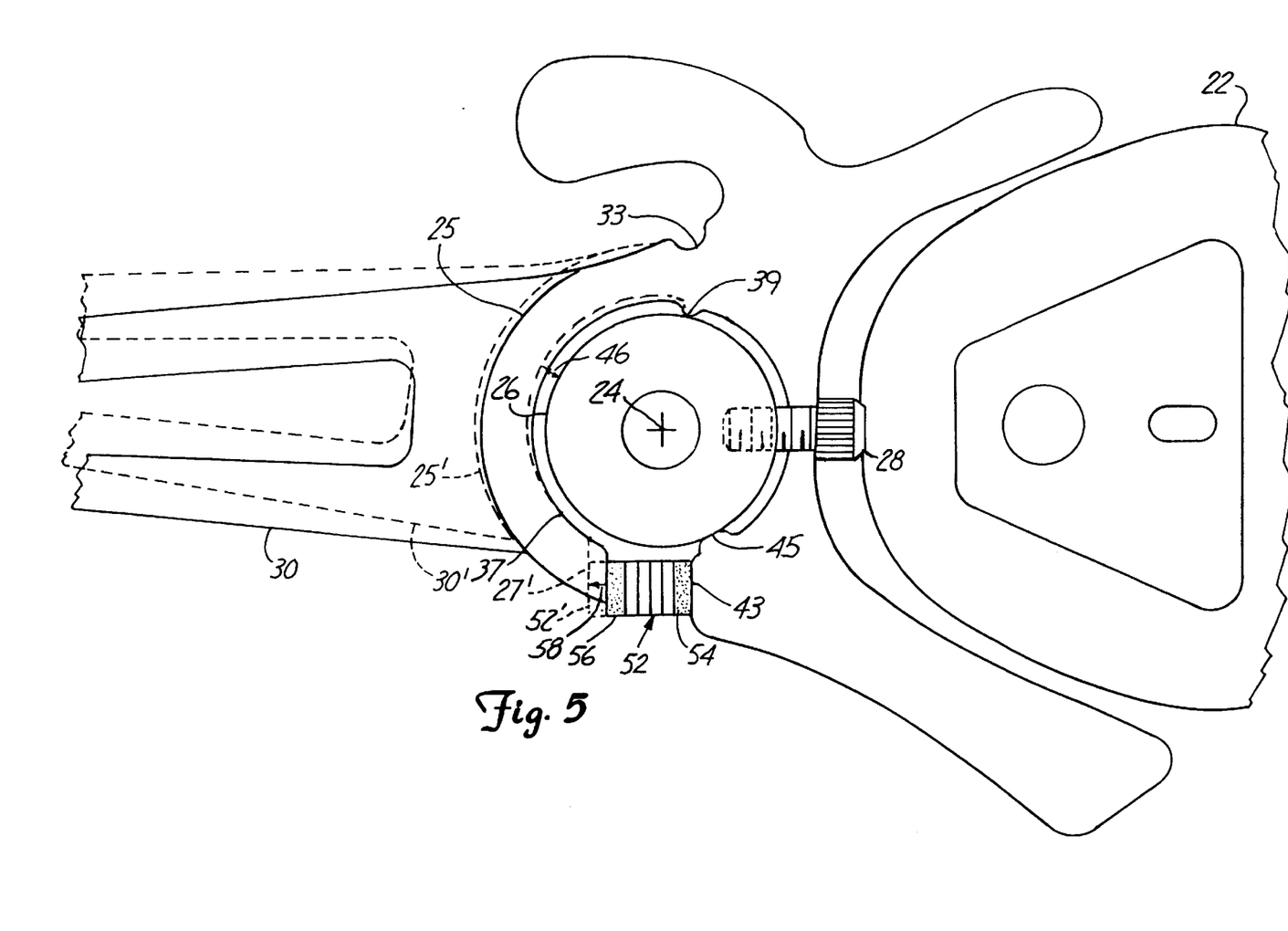
FIG. 5 is an enlarged plan view of the E-block piezoelectric microactuator shown in FIG. 4.

FIG. 5 is an enlarged plan view of the microactuation system of disc drive assembly 50 shown in FIG. 4. Piezoelectric element 52 may be selectively controlled, by applying a voltage at terminals 54 and 56, to expand in the direction of arrow 58 (along the d33 axis of piezoelectric element 52), the exaggerated outer profile of the expanded element being shown in dashed lines as 52'. The expansion of piezoelectric element 52 distorts E-block body 25 to the position shown in dashed lines as 25'. Expansion occurs only in the direction of arrow 58 because the E-block body material adjacent to the proximal end 43 of piezoelectric element 52 is rigidly fastened to pivot cartridge 26 at point 45. Essentially, gap 46 between E-block body 25 and pivot cartridge 26 is widened, as E-block body 25 distortionally rotates due to the expansion of piezoelectric element 52. The elastic distortion of E-block body 25 is focused at its weakest point, which is the narrow portion of E-block material between hinge point 39 and relief 33, straining that material within elastic limits to distortionally rotate E-block body 25. Actuator arm 30 is therefore displaced to the position shown in dashed lines as 30'. In a similar manner, contraction of piezoelectric element 52 would operate to narrow gap 46 between E-block body 25 and pivot cartridge 26, thereby displacing actuator arm 30 downward in the configuration shown in FIG. 5.

Providing the piezoelectric microactuator directly adjacent to pivot cartridge 26 produces a large displacement of slider 38 in response to an expansion or contraction of the piezoelectric microactuator, due to the length of actuator arm 30 between the microactuator and slider 38. In an exemplary embodiment, the slider movement to piezoelectric expansion ratio is approximately 8:1. Also, head skew due to movement effected by the microactuator is minimized, since the microactuator is located directly adjacent to axis 24, about which conventional rotational actuation effected by VCM 22 occurs.

The piezoelectric microactuator spans the vertical height of E-block body 25, but does not have any effect on the thicknesses of individual actuator arms 30 extending from E-block body 25. Therefore, the actuator arms 30 may be designed with minimal thicknesses and masses, improving the overall performance of the disc drive system.

The piezoelectric microactuator may be configured to expand and contract in response to applied voltages in the d31, d32 or d33 directions. The preferred configuration (yielding the greatest microactuator movement for an applied voltage) depends on the selected dimensions of the piezoelectric microactuator for a particular disc drive, but any of the configurations are acceptable.

Although the present invention has been described with reference to preferred embodiments, workers skilled in the art will recognize that changes may be made in form and detail without departing from the spirit and scope of the invention.

What is claimed is:

1. A system for positioning a transducing head of a disc drive over a selected track of a rotatable disc having a plurality of concentric tracks, the system comprising:

an actuator assembly having:
- an E-block body including a cavity, the E-block body being movable about an axis;
- at least one actuator arm extending from the E-block body;
- a head suspension mechanism including the transducing head connected to an end of the actuator arm; and
- a pivot cartridge in the cavity in the E-block body, the E-block body being attached to the pivot cartridge and forming a hinge point between the E-block body and the pivot cartridge;

a low resolution motor operatively coupled to the actuator assembly to rotate the actuator assembly about the axis to effect coarse positioning of the head with respect to the selected track of the rotatable disc; and a piezoelectric element in the E-block body controllable to selectively expand and contract based on a voltage across the piezoelectric element, thereby distorting the E-block body around the hinge point to effect fine positioning of the head with respect to the selected track of the rotatable disc.

2. The system of claim 1, further comprising a relief formed in the E-block body adjacent to the hinge point to facilitate distortion of the E-block body in response to expansion and contraction of the piezoelectric element.

3. The system of claim 1, wherein the piezoelectric element includes first and second conductive terminals and a plurality of piezoelectric crystal layers.

4. The system of claim 3, wherein the piezoelectric element expands and contracts in a d32 direction in response to the voltage applied to the first and second terminals.

5. The system of claim 3, wherein the piezoelectric element expands and contracts in a d33 direction in response to the voltage applied to the first and second terminals.

6. The system of claim 3, wherein the piezoelectric element expands and contracts in a d31 direction in response to the voltage applied to the first and second terminals.

7. A method of positioning a transducing head of a disc drive over a selected track of a rotatable disc having a plurality of concentric tracks, the method comprising:

providing an actuator assembly having an E-block body including a cavity, the E-block body being movable about an axis, at least one actuator arm extending from the E-block body, a head suspension mechanism including the transducing head connected to an end of the actuator arm, and a pivot cartridge in the cavity in the E-block body, the E-block body being attached to the pivot cartridge and forming a hinge point between the E-block body and the pivot cartridge;

operating a low resolution motor to rotate the actuator assembly about the axis to effect coarse positioning of the head with respect to the selected track of the rotatable disc; and applying a voltage to selectively expand and contract a piezoelectric element in the E-block body, thereby distorting the E-block body around the hinge point to effect fine positioning of the head with respect to the selected track of the rotatable disc.

8. The method of claim 7, further comprising forming a relief in the E-block body adjacent to the hinge point to facilitate distortion of the E-block body in response to expansion and contraction of the piezoelectric element.

* * * * *

UNITED STATES PATENT AND TRADEMARK OFFICE
CERTIFICATE OF CORRECTION

PATENT NO.    : 6,025,975
DATED         : February 15, 2000
INVENTOR(S)   : Anoush M. Fard et al.

It is certified that error appears in the above-identified patent and that said Letters Patent is hereby corrected as shown below:

<u>Title page,</u>
Item [56], References Cited, U.S. PATENT DOCUMENTS, insert --

| | | | |
|---|---|---|---|
| 5,867,347 | 02/02/99 | Knight et al. | 360/104 |
| 5,657,188 | 08/12/97 | Jurgenson et al. | 360/106 |
| 5,623,461 | 04/22/97 | Sohmuta | 369/32 |
| 5,552,809 | 09/03/96 | Hosono et al. | 347/10 |
| 5,521,778 | 05/28/96 | Boutaghou | 360/106 |
| 5,303,105 | 04/12/94 | Jorgenson | 360/106 |
| 5,276,573 | 01/04/94 | Harada et al. | 360/103 |
| 5,255,016 | 10/19/93 | Usui et al. | 346/140 |
| 5,189,578 | 02/23/93 | Mori et al. | 360/106 |
| 5,177,652 | 01/05/93 | Yamaguchi et al. | 360/78.05 |
| 5,105,408 | 04/14/92 | Lee et al. | 369/44.15 |
| 5,079,659 | 01/07/92 | Hagen | 360/104 |
| 5,065,268 | 11/12/91 | Hagen | 360/104 |
| 5,034,828 | 07/23/91 | Ananth et al. | 360/75 |
| 5,021,906 | 06/04/91 | Chang et al. | 360/103 |
| 4,914,725 | 04/03/90 | Belser et al. | 318/560 |
| 4,853,810 | 08/01/89 | Pohl et al. | 360/103 |
| 4,764,829 | 08/16/88 | Makino | 360/106 |
| 4,651,242 | 03/17/87 | Hirano et al. | 360/103 |
| 4,620,251 | 10/28/86 | Gitzendanner | 360/103 |
| 4,605,977 | 08/12/86 | Matthews | 360/103 |
| 4,374,402 | 02/15/83 | Blessom et al. | 360/104 |
| 3,924,268 | 12/02/75 | McIntosh et al. | 360/78 |
| 3,678,482 | 07/18/72 | Bilawala | 340/174.1 |

FOREIGN PATENT DOCUMENTS insert --

| | | |
|---|---|---|
| JP 07-085621 | 03/31/95 | JAPAN |
| JP 05-094682 | 04/16/96 | JAPAN |
| JP 63-122069 | 05/88 | JAPAN |
| JP 06-020412 | 01/94 | JAPAN |
| JP 04-134681 | 05/92 | JAPAN |
| JP 04-368676 | 12/92 | JAPAN |
| JP 02-263369 | 04/03/89 | JAPAN |
| EP O 412 221 B1 | 11/28/89 | EP |

UNITED STATES PATENT AND TRADEMARK OFFICE
CERTIFICATE OF CORRECTION

PATENT NO. : 6,025,975
DATED : February 15, 2000
INVENTOR(S) : Anoush M. Fard et al.

It is certified that error appears in the above-identified patent and that said Letters Patent is hereby corrected as shown below:

OTHER ART (Including Author, Title, Date, Pertinent Pages, Etc.)
"Silicon Micromachined Electromagnetic Microactuators for Rigid Disk Drives" by Tang et al, IEEE Transactions on Magnetics, Vol 31, No. 6, November 1995
"Magnetic Recording Head Positioning at Very High Track Densities Using a Microactuator-Based, Two-Stage servo System" by Fan et al.,
IEEE Transactions on Industrial Electronics, Vol. 42, No. 3, June 1995
"A Flexural Piggyback Milli-Actuator for Over 5 Gbit/in$^2$ Density Magnetic Recording" by Koganezawa et al, IEEE Transactions on Magnetics, Vol. 32, No. 5, September 1996
"Transverse Mode Electrostatic Microactuator for MEMS-Based HDD Slider" by Imamura et al, IEEE 1996
"An Experiment for Head Positioning System Using Submicron Track-width GMR Head" by Yoshikawa et al., IEEE Transactions on Magnetics, Vol. 32, No. 5, September 1996
"Micro Electrostatic Actuators in Dual-Stage Disk Drives with High Track Density" by Tang et al., IEEE Transactions on Magnetics, Vol. 32, No. 5, September 1996
"Piezoelectric Microactuator Compensating for Off-Track Errors in Magnetic Disk Drives" by Imamura et al, Advance Information Storage Systems, Vol. 5, pp 119-125.
"A Dual-Stage Magnetic Disk Drive Actuator Using a Piezoelectric Device for High Track Density" by Mori et al., IEEE Transactions on Magnetics, Vol. 27, No. 6, November 1991.
"Dynamic Loading Criteria for 3-1/2 Inch Inline HDD Using Multilayer Piezoelectric Load/Unload Mechanism" by Kajitani et al.,
IEEE Transactions on Magnetics, Vol. 27, No. 6, November 1991
"Design, Fabrication, and Testing of Silicon Microgimbals for Super-Compact Rigid Disk Drives" by Temesvary et al., Journal of Microelectromechanical Systems, Vol. 4, N --.

Signed and Sealed this

Eighteenth Day of June, 2002

*Attest:*

*Attesting Officer*

JAMES E. ROGAN
*Director of the United States Patent and Trademark Office*